[12] United States Patent  
Narin et al.

(10) Patent No.: US 7,634,429 B2  
(45) Date of Patent: Dec. 15, 2009

(54) ARCHITECTURE FOR AN ELECTRONIC SHOPPING SERVICE INTEGRATABLE WITH A SOFTWARE APPLICATION

(75) Inventors: Attila Narin, Bothell, WA (US); Marco A. DeMello, Redmond, WA (US); Yoram Yaacovi, Redmond, WA (US); Jeffrey A. Alger, Redmond, WA (US); Leroy B. Keely, Portola Valley, CA (US); David Michael Silver, Sammamish, WA (US); Christopher Robert Richard Madonna, Seattle, WA (US); John Beezer, Seattle, WA (US); Kathryn E. Hughes, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1096 days.

(21) Appl. No.: 10/840,516

(22) Filed: May 6, 2004

(65) Prior Publication Data

US 2005/0033663 A1    Feb. 10, 2005

Related U.S. Application Data

(60) Division of application No. 09/894,519, filed on Jun. 28, 2001, now abandoned, which is a continuation-in-part of application No. 09/836,524, filed on Apr. 17, 2001, now Pat. No. 7,225,159.

(60) Provisional application No. 60/215,488, filed on Jun. 30, 2000.

(51) Int. Cl.
    *G06Q 30/00* (2006.01)
(52) U.S. Cl. .......................................... 705/26; 705/37

(58) Field of Classification Search ................ 705/26, 705/37
See application file for complete search history.

(56) References Cited

U.S. PATENT DOCUMENTS 4,405,829 A    9/1983    Rivest et al. .............. 178/22.1

(Continued)

FOREIGN PATENT DOCUMENTS

EP    0 715 245 A1    6/1996

(Continued)

OTHER PUBLICATIONS

Ozer, Jan. The making of Publishing Digital Video Explorer. E-Media Professional, Wilton, Oct. 1997, vol. 10, Iss. 10, p. 96, downloaded from ProQuest on the Internet on Jun. 3, 2008, 16 pages.*

(Continued)

*Primary Examiner*—James Zurita
(74) *Attorney, Agent, or Firm*—Woodcock Washburn LLP

(57) ABSTRACT

An architecture for an integrated shopping service that enables electronic shopping from within a software application. The software application includes web browsing functionality, with the capability to navigate to a limited set of web sites. The client machine on which the software runs maintains a local list of the limited set of web sites that can be accessed from within the software application. A directory server maintains a list of retail web sites that can be added to the client's local list of accessible web sites. Each client machine that runs the software application connects to the directory server in order to add web sites to the locally-maintained list of sites that can be accessed from within the integrated shopping service.

7 Claims, 9 Drawing Sheets

U.S. PATENT DOCUMENTS

| | | | | |
|---|---|---|---|---|
| 4,688,169 A | 8/1987 | Joshi | | 364/200 |
| 4,827,508 A | 5/1989 | Shear | | 380/4 |
| 4,924,378 A | 5/1990 | Hershey et al. | | 713/201 |
| 4,977,594 A | 12/1990 | Shear | | 380/4 |
| 5,050,213 A | 9/1991 | Shear | | 380/25 |
| 5,191,573 A | 3/1993 | Hair | | 369/84 |
| 5,222,134 A | 6/1993 | Waite et al. | | 380/4 |
| 5,359,659 A | 10/1994 | Rosenthal | | 380/4 |
| 5,410,598 A | 4/1995 | Shear | | 380/4 |
| 5,509,070 A | 4/1996 | Schull | | 380/4 |
| 5,530,235 A | 6/1996 | Stefik et al. | | 235/492 |
| 5,606,609 A | 2/1997 | Houser et al. | | 380/4 |
| 5,625,693 A | 4/1997 | Rohatgi et al. | | 380/23 |
| 5,629,980 A | 5/1997 | Stefik et al. | | 380/4 |
| 5,634,012 A | 5/1997 | Stefik et al. | | 395/239 |
| 5,638,443 A | 6/1997 | Stefik et al. | | 380/4 |
| 5,654,746 A | 8/1997 | McMullan, Jr. et al. | | 725/29 |
| 5,666,411 A | 9/1997 | McCarty | | 705/51 |
| 5,675,734 A | 10/1997 | Hair | | 395/200.01 |
| 5,708,780 A | 1/1998 | Levergood et al. | | 395/200.12 |
| 5,715,403 A | 2/1998 | Stefik | | 395/244 |
| 5,724,425 A | 3/1998 | Chang et al. | | 380/25 |
| 5,734,823 A | 3/1998 | Saigh et al. | | 395/200.06 |
| 5,734,891 A | 3/1998 | Saigh | | 395/610 |
| 5,742,677 A | 4/1998 | Pinder et al. | | 380/242 |
| 5,765,152 A | 6/1998 | Erickson | | 707/9 |
| 5,784,609 A | 7/1998 | Kurihara | | 707/9 |
| 5,809,145 A | 9/1998 | Slik et al. | | 380/25 |
| 5,832,451 A | 11/1998 | Flake et al. | | 705/5 |
| 5,835,732 A | 11/1998 | Kikinis et al. | | 395/281 |
| 5,845,281 A | 12/1998 | Benson et al. | | 707/9 |
| 5,864,620 A | 1/1999 | Pettitt | | 380/4 |
| 5,883,955 A | 3/1999 | Ronning | | 380/4 |
| 5,884,309 A * | 3/1999 | Vanechanos, Jr. | | 707/10 |
| 5,892,900 A | 4/1999 | Ginter et al. | | 395/186 |
| 5,910,987 A | 6/1999 | Ginter et al. | | 380/24 |
| 5,915,019 A | 6/1999 | Ginter et al. | | 380/4 |
| 5,917,912 A | 6/1999 | Ginter et al. | | 380/24 |
| 5,920,861 A | 7/1999 | Hall et al. | | 707/9 |
| 5,933,498 A | 8/1999 | Schneck et al. | | 380/4 |
| 5,940,504 A | 8/1999 | Griswold | | 380/4 |
| 5,943,422 A | 8/1999 | Van Wie et al. | | 380/9 |
| 5,949,876 A | 9/1999 | Ginter et al. | | 380/4 |
| 5,958,051 A | 9/1999 | Renaud et al. | | 713/200 |
| 5,970,475 A | 10/1999 | Barnes et al. | | 705/27 |
| 5,982,891 A | 11/1999 | Ginter et al. | | 380/4 |
| 5,983,245 A | 11/1999 | Newman et al. | | 707/513 |
| 5,983,273 A | 11/1999 | White et al. | | 709/229 |
| 5,991,399 A | 11/1999 | Graunke et al. | | 380/4 |
| 5,991,402 A | 11/1999 | Jia et al. | | 705/59 |
| 5,999,622 A | 12/1999 | Yasukawa et al. | | 380/4 |
| 6,006,332 A | 12/1999 | Rabne et al. | | 713/201 |
| 6,018,724 A | 1/2000 | Arent | | 705/44 |
| 6,021,492 A | 2/2000 | May | | 713/200 |
| 6,029,046 A | 2/2000 | Khan et al. | | 725/31 |
| 6,029,141 A | 2/2000 | Bezos et al. | | 705/27 |
| 6,035,403 A | 3/2000 | Subbiah et al. | | 713/201 |
| 6,037,935 A | 3/2000 | Bates et al. | | 345/760 |
| 6,049,612 A | 4/2000 | Fielder et al. | | 380/44 |
| 6,064,979 A | 5/2000 | Perkowski | | 705/26 |
| 6,067,582 A | 5/2000 | Smith et al. | | 710/5 |
| 6,088,717 A | 7/2000 | Reed et al. | | 709/201 |
| 6,133,916 A | 10/2000 | Bukszar et al. | | 345/335 |
| 6,195,667 B1 | 2/2001 | Duga et al. | | 715/513 |
| 6,199,053 B1 | 3/2001 | Herbert et al. | | 705/76 |
| 6,226,618 B1 | 5/2001 | Downs et al. | | 705/1 |
| 6,298,446 B1 | 10/2001 | Schreiber et al. | | 713/201 |
| 6,311,269 B2 | 10/2001 | Luckenbaugh et al. | | 713/154 |
| 6,324,288 B1 | 11/2001 | Hoffman | | 380/249 |
| 6,331,865 B1 * | 12/2001 | Sachs et al. | | 715/776 |
| 6,363,356 B1 | 3/2002 | Horstmann | | 705/26 |
| 6,385,596 B1 | 5/2002 | Wiser et al. | | 705/51 |
| 6,389,403 B1 | 5/2002 | Dorak | | |
| 6,415,270 B1 | 7/2002 | Rackson et al. | | 705/37 |
| 6,425,017 B1 | 7/2002 | Dievendorff et al. | | 709/315 |
| 6,449,645 B1 | 9/2002 | Nash | | 709/224 |
| 6,606,604 B1 | 8/2003 | Dutta | | 705/26 |
| 6,629,138 B1 | 9/2003 | Lambert et al. | | 709/224 |
| 6,636,896 B1 | 10/2003 | Philyaw | | 709/238 |
| 6,694,320 B1 | 2/2004 | Ortiz et al. | | 707/101 |
| 6,718,361 B1 | 4/2004 | Basani et al. | | 709/201 |
| 6,753,887 B2 | 6/2004 | Carolan et al. | | 345/764 |
| 6,763,334 B1 | 7/2004 | Matsumoto | | |
| 6,917,923 B1 | 7/2005 | Dimenstein | | |
| 2001/0011238 A1 | 8/2001 | Ebergard et al. | | 705/27 |
| 2001/0037302 A1 | 11/2001 | McFadzean et al. | | 705/51 |
| 2002/0002611 A1 | 1/2002 | Vange | | 709/223 |
| 2002/0023059 A1 | 2/2002 | Bari | | |
| 2002/0033844 A1 | 3/2002 | Levy et al. | | 345/744 |
| 2002/0065772 A1 | 5/2002 | Saliba et al. | | 705/40 |
| 2002/0069265 A1 | 6/2002 | Bountour et al. | | 709/219 |
| 2002/0120507 A1 | 8/2002 | Chanos et al. | | 705/14 |
| 2002/0138555 A1 | 9/2002 | Yu | | 709/203 |
| 2002/0143813 A1 | 10/2002 | Jellum et al. | | 707/511 |
| 2002/0169805 A1 | 11/2002 | Edge | | 707/528 |
| 2003/0167392 A1 | 9/2003 | Fransdonk | | 713/156 |
| 2005/0010475 A1 | 1/2005 | Perkowski et al. | | 705/14 |

FOREIGN PATENT DOCUMENTS

| | | |
|---|---|---|
| EP | 0 778 512 A2 | 6/1997 |
| EP | 0 795 809 A2 | 9/1997 |
| EP | 0 798 892 A2 | 10/1997 |
| EP | 0 843 449 A2 | 5/1998 |
| WO | WO 96/24092 | 8/1996 |
| WO | WO 96/42041 | 12/1996 |
| WO | WO 98/44402 | 10/1998 |
| WO | WO 98/45768 | 10/1998 |
| WO | WO 98/58306 | 12/1998 |
| WO | WO 99/01815 | 1/1999 |
| WO | WO 99/26123 | 5/1999 |
| WO | WO 99/45491 | 9/1999 |
| WO | WO 99/55055 | 12/1999 |
| WO | WO 99/63416 | 12/1999 |
| WO | WO 00/08909 | 2/2000 |
| WO | WO 00/21239 | 4/2000 |
| WO | WO 00/75760 A1 | 12/2000 |

OTHER PUBLICATIONS

Hui Lou: A server-independent password authentication method foraccess-controlled Web pages, Global Telecommunications Conference, 2000. GLOBECOM apos;00. IEEE vol. 1, Issue , 2000 pp. 361 - 364, downloaded from IEEE on the Internet on Sep. 27, 2009, 4 pages.*

"OpeneBook™ Publications Structure 1.0.1", Recommended Specification Jul. 2, 2001, www.openebook.org/oebpsdownload.htm.

Takahashi, K., et al., "Intelligent Pages: Collecting Shop and Service Information With Software Agents," *Applied Artificial Intelligence*, Sep. 1997, 11(6), 489- 499.

Yoon, Seong Soon, et al, "Prototype Development of Directory Interface on Web Browser," *Computer & Software Technol. Lab., ETRI*, Feb. 15-18, 1999, 90-92.

Uehara, S., et al., "Enterprise Model-Based Software Architecture With Server Component Integration," *Fujitsu Laboratories Ltd.*, 1998, 356-363.

Auchsmith, D., "Tamper Resistant Software: An Implementation", *First International Workshop*, Anderson, Ross (ed., ) 1996, 317-333.

Jaeger, T., "Flexible Control of Downloaded Executable Content", *ACM Transactions on Information and System Security*, 1999, 2(2), 177-228.

Shamir, A. et al., "Playing Hide and Seek with Stored Keys", *Third International Conference*, 1999, franklin, M. (ed), 118-124.

In the United States Patent and Trademark Office, Non Final Office Action in re: U.S. Appl. No. 09/894,519, filed Jun. 28, 2001, dated Aug. 20, 2004, 9 pages.

In the United States Patent and Trademark Office, Final Office Action in re: U.S. Appl. No. 09/894,519, filed Jun. 28, 2001, dated Feb. 16, 2005, 10 pages.

In the United States Patent and Trademark Office, Non Final Office Action in re: U.S. Appl. No. 09/894,519, filed Jun. 28, 2001, dated Jul. 27, 2005, 9 pages.

In the United States Patent and Trademark Office, Non Final Office Action in re: U.S. Appl. No. 09/894,519, filed Jun. 28, 2001, dated Apr. 19, 2006, 10 pages.

In the United States Patent and Trademark Office, Non Final Office Action in re: U.S. Appl. No. 09/836,524, filed Apr. 17, 2001, dated Feb. 2, 2005, 12 pages.

In the United States Patent and Trademark Office, Final Office Action in re: U.S. Appl. No. 09/836,524, filed Apr. 17, 2001, dated Jul. 19, 2005, 16 pages.

In the United States Patent and Trademark Office, Non Final Office Action in re: U.S. Appl. No. 09/836,524, filed Apr. 17, 2001, dated Feb. 1, 2006, 13 pages.

* cited by examiner

ARCHITECTURE FOR AN ELECTRONIC SHOPPING SERVICE INTEGRATABLE WITH A SOFTWARE APPLICATION

CROSS-REFERENCE TO RELATED CASES

This application is a divisional of U.S. patent application No. 09/894,519, entitled "Architecture for an Electronic Shopping Service Integratable with a Software Application," filed on Jun. 28, 2001, which claims the benefit of U.S. Provisional Application No. 60/215,488, entitled "Integrated Bookstore," filed on Jun. 30, 2000, and which is a continuation-in-part of U.S. Patent Application No. 09/836,524, entitled "Method for Authenticating and Securing Integrated Bookstore Entries," filed Apr. 17, 2001.

COPYRIGHT INFORMATION

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

FIELD OF THE INVENTION

The present invention relates generally to the field of computing. More particularly, the invention relates to a system and method for providing an integrated shopping service within an application program. One specific application of such an integrated shopping service is a service that allows users of a content-rendering application to shop for digital content at a dynamically-updateable set of retail web sites.

BACKGROUND OF THE INVENTION

Certain software requires third parties to provide digital content in order to make the software valuable to users. A prime example is an application for rendering books, audio, video, etc. Such an application is useful only when digital content—e.g., text, audio, video, etc.—is available for use with the application or device, and such digital content is generally provided by third parties.

Typically, a user obtains the content by using a stand-alone web browser (e.g. INTERNET EXPLORER or NETSCAPE NAVIGATOR) to find and obtain content from Internet web sites that provide it. Sites that distribute content may be located with the aid of a search engine. This method, however, does not offer the user the convenience of shopping for content from within the rendering application.

As an alternative to the stand-alone browser, a browser may be integrated into the content-rendering application, and the application may be hard-coded to point the browser to one or more web sites that provide content. This approach, however, has drawbacks; if the universal record locators (URLs) of particular web sites are hard-coded into the browser, it is difficult to add or delete web sites to or from the list, or to customize the list for different instances of the application.

In view of the foregoing, there is a need for a system that overcomes the drawbacks of the prior art.

SUMMARY OF THE INVENTION

The present invention provides an infrastructure for a shopping service within a user application, such as a content-rendering application. The application can provide a context for the search. An application in accordance with the invention includes a link to a retail directory server (e.g., the application may store the universal record locator or "URL" of such a server). Upon being contacted by the application, the retail directory server renders on the user's machine a web page containing a list of retail web sites. As the application may drive "a context" the web sites may be developed specifically for the client, both from a matter of content and style of presentation. The web page rendered by the retail directory server offers the user the chance to add some or all of the listed sites to a private list of retailers that is stored on the client machine. The particular set of retail sites listed in the directory server can be modified at any time by the party who controls the directory server. The retail directory server may also provide redirection to other sites—i.e., the retail directory server, in addition to allowing the user to add particular sites to his or her private list, may also allow the user to be redirected to another site by clicking a link on the page displayed by the retail directory server (and the operator of the retail directory server may, for example, sell to the owners of such other sites the privilege of having the retail directory server display such a link). An application in accordance with the invention also includes a retail shopping user interface, which displays to the user all retailers in his or her private list and allows the user to connect to any of the retailers on that list. A retail shopping service is thus "integrated" into the application.

In one embodiment of the invention, the application that incorporates an integrated shopping service is a content-rendering application, such as an eBooks reading application. In such an application, the integrated shopping service may take the form of an "integrated bookstore," which displays a list of on-line bookstores that sell eBooks and allows the user to navigate to those bookstores directly through the list. The retail directory server whose URL is included in the application may provide a "bookstore directory," which renders a list of on-line bookstores on the user's machine and offers the user the opportunity to add those bookstores to his or her private list. The actual list of bookstores displayed to the user as part of the application's "integrated bookstore" is the private list of bookstores chosen by the user from the bookstore directory page.

In another embodiment, the retail directory server may be configured to provide arbitrary data to the user's machine, rather than merely a list of retail web sites. For example, the directory server may upload to the user's machine a set of off-line catalogues that the user can use to shop for content when not connected to the Internet. For example, if the user's machine is a palm-size computer, the user may be able to shop off-line for content, where off-line orders are stored for transmission to an appropriate web site when the device is cradled. The user's machine may store parameters (e.g., in the form of cookies) that allow customized content to be delivered to the user from the retail directory server. For example, the user may subscribe to an on-line newsletter (e.g., through a previous contact with the retail directory), and this newsletter may then be updated on the user's machine each time the bookstore directory server is contacted. In contrast to systems that merely hardcode a list of retail web sites into an application, the use of a bookstore directory server, whose information can be updated or modified at any time, supports extensibility of the directory function.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Overview

The Internet has provided consumers with opportunities to shop for numerous and varied products on line. Using a browser, a consumer can visit a seemingly limitless number of web sites and purchase nearly any type of good or service. Some types of goods, and services, however, are particularly adapted to be used with certain software applications. A case in point is digital content (e.g., books, audio, video, etc.) that comes delivered in a particular format for use with a certain type of rendering application (e.g., an electronic book reader, an audio player, a video player, etc.). It is particularly useful for a consumer to be able to purchase such content from within the rendering application itself. It is further useful to limit the universe of web sites that a consumer can access from within the rendering application to those web sites that distribute digital content adapted for the application. The present invention provides an architecture for a shopping service that allows a user to visit certain web sites (e.g., retail web sites) from within an application, and that allows a third party entity to control which web sites can be accessed from within the application.

Exemplary Computing Environment

Figure 1:
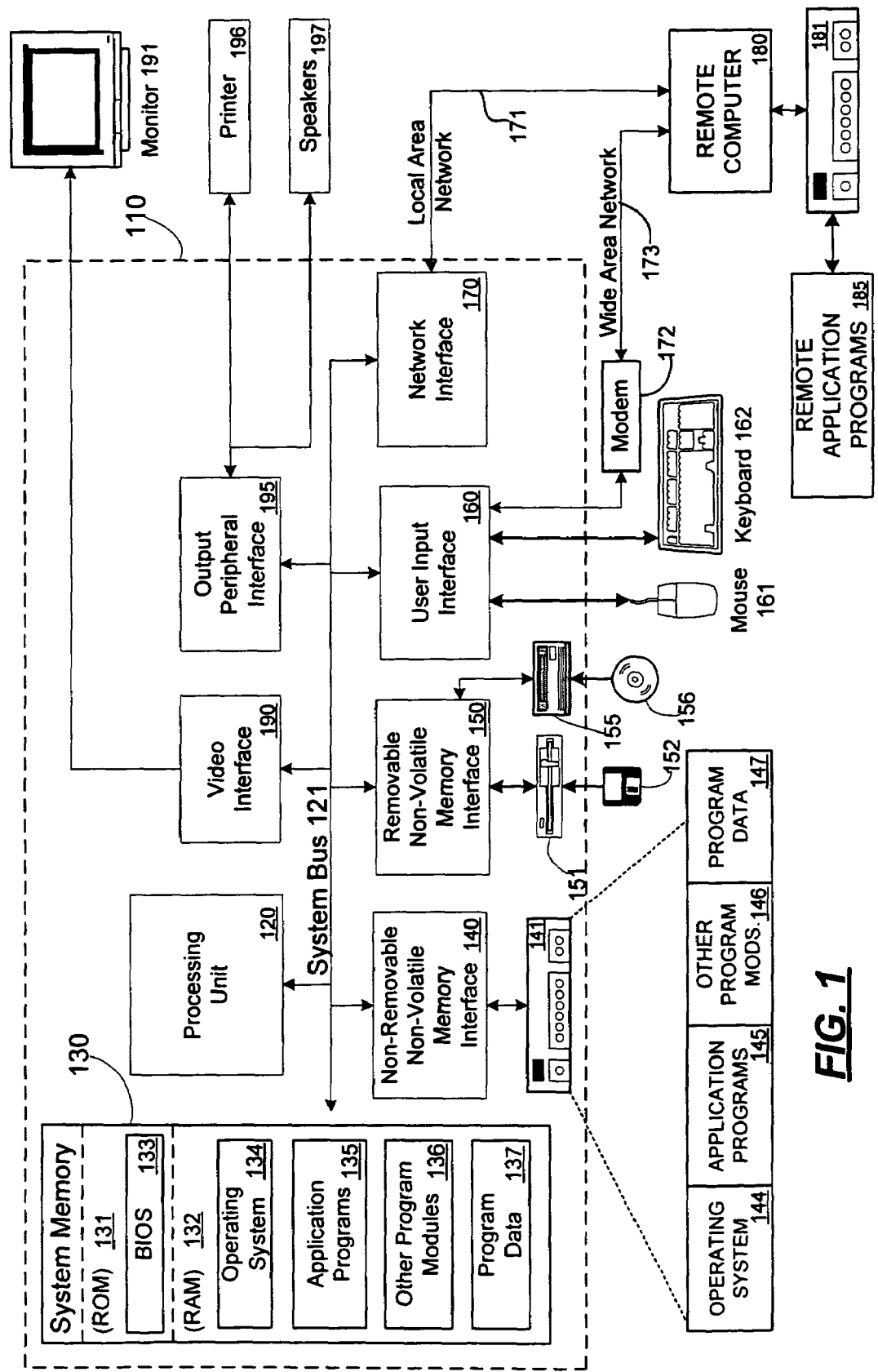
FIG. 1 is a block diagram of an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Application with Integrated Shopping Feature

Figure 2:
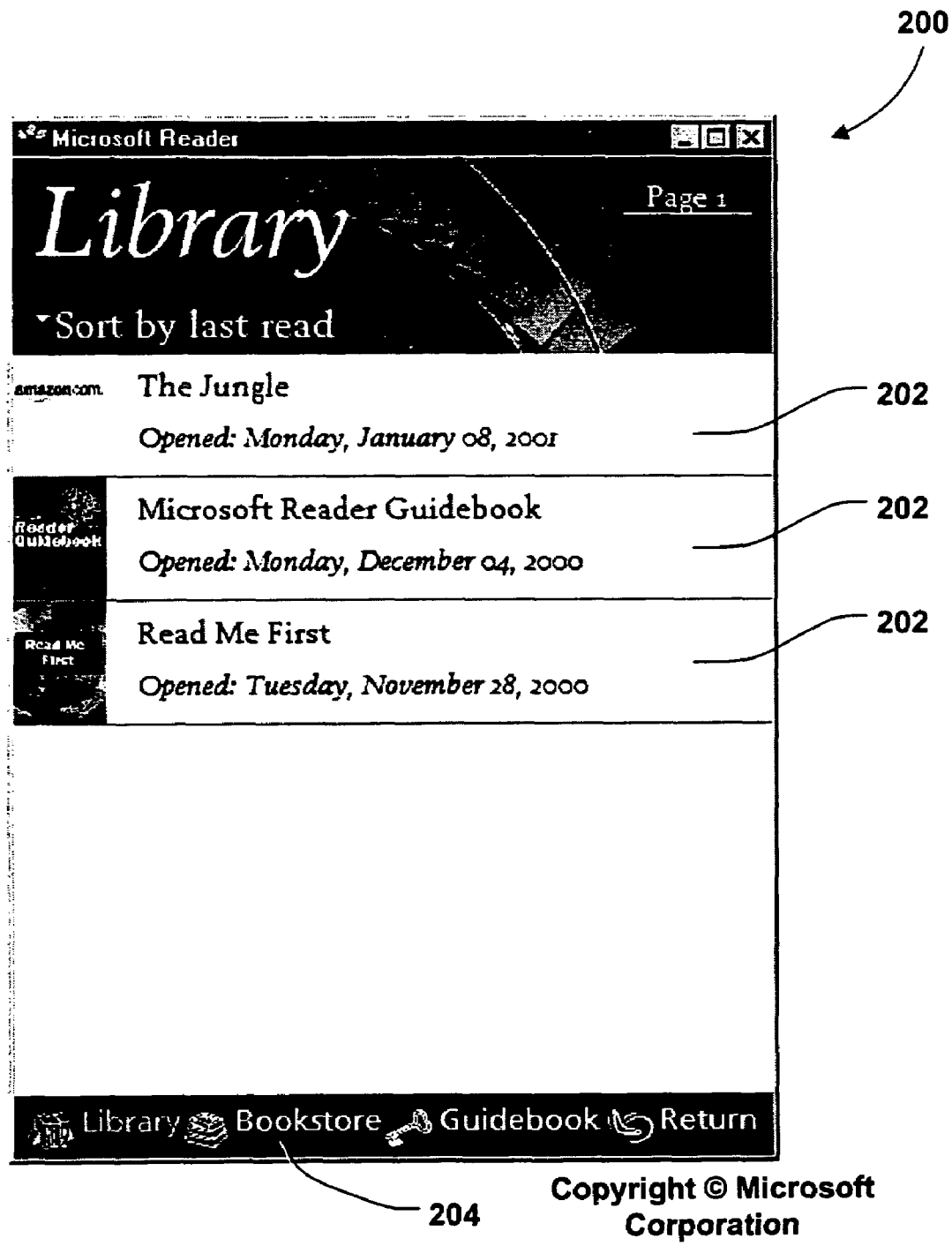
FIG. 2 is a diagram of a user interface for an exemplary software application in accordance with aspects of the invention.

Referring now to FIG. 2, there is shown a user interface of an application 200. In FIG. 2, application 200 is depicted as a text-rendering application for reading electronic books ("eBooks") 202. It will be appreciated, however, that a text-rendering application is merely exemplary, and application 200 may be any type of application. For example, application 200 may be a rendering application that renders other types of content (e.g., music, video, multimedia, etc.). As described below, it is particularly useful to incorporate an integrated shopping feature into a content-rendering application, because the integrated shopping feature may be used to shop for digital content that is adapted to be rendered by the rendering application. However, application 200 need not be such a rendering application. In greater generality, application 200 may be any application in which it is useful or desirable to incorporate an integrated shopping feature as described below. All such embodiments of application 200 are within the spirit and scope of the invention.

As noted above, in the example of FIG. 2 application 200 renders eBooks 202. eBooks are known in the art and are described generally in "Open eBook Publication Structure 1.0" (Sep. 16, 1999), available at http://www.openebook.org/oebpsdownload.htm, which is incorporated herein by reference. Typically (although not necessarily), eBooks are obtained separately from the application used to render them—i.e., the user uses a stand-alone browser to navigate to a web site that distributes eBooks, chooses an eBook, and then downloads a file containing the eBooks to the user's computing device, at which point the user may use application 200 to "click" on one of eBooks 202 (e.g., by using pointing device 161, shown in FIG. 1) in order to open and render the eBook. At least some of eBooks 202 may have been obtained by a user's navigating to a web site and obtaining the book (either directly or indirectly) from that web site. However, since text-rendering application 200 is of limited value without a source of eBooks, it is particularly useful to incorporate into application 200 a shopping feature that permits a user to shop for eBooks from within application 200. The present invention provides such a feature.

Figure 3:
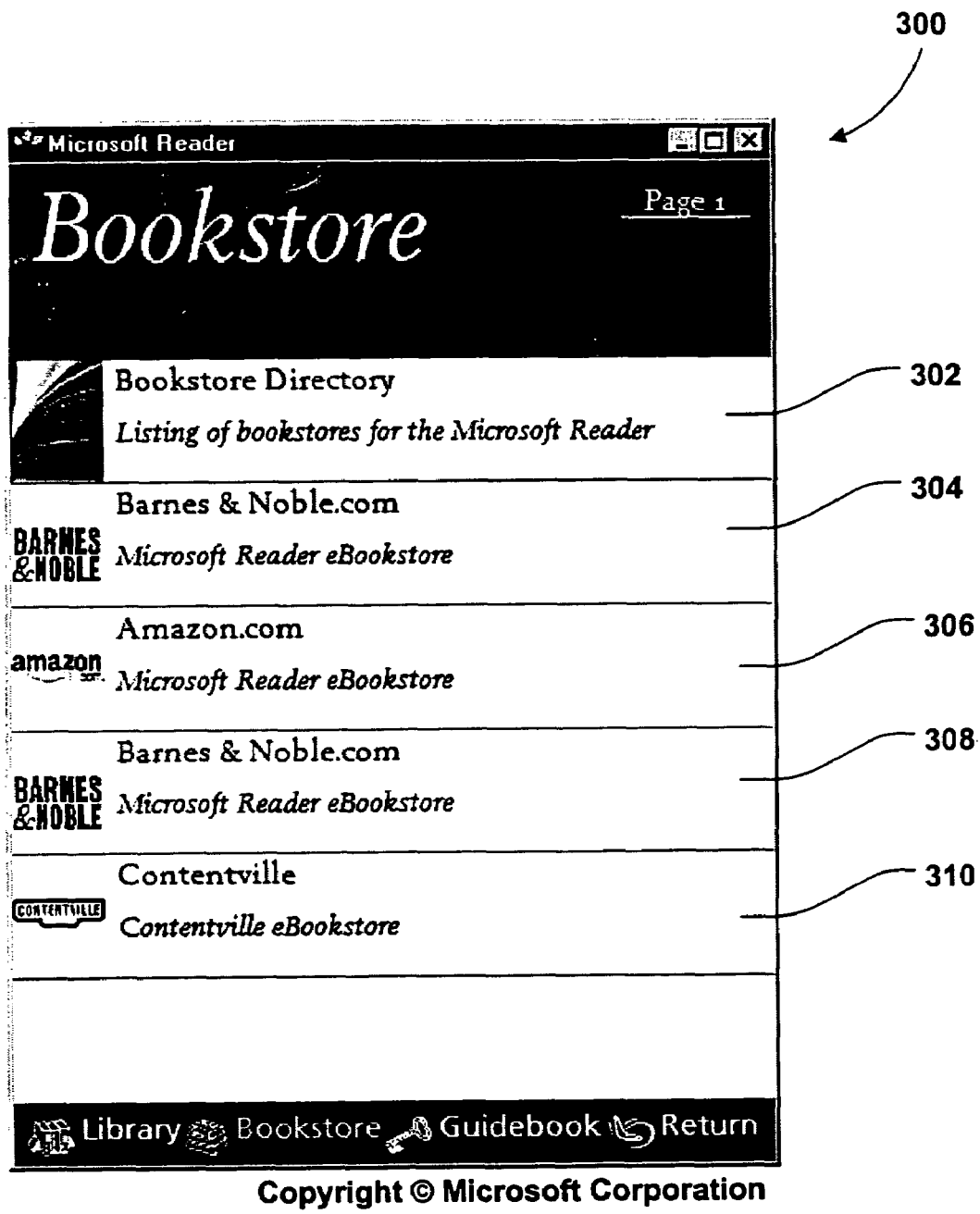
FIG. 3 is a diagram of a user interface for an exemplary shopping service which, in accordance with aspects of the invention, is integrated into a software application.

FIG. 3 shows a user interface for an exemplary shopping service 300 in accordance with the invention. Preferably, shopping service 300 provides an interface whereby a user may visit web sites from within application 200. For example, the exemplary interface shown in FIG. 3 includes a list of links 302-310; clicking one of the links (e.g., by using pointing device 161, shown in FIG. 1) allows the user to visit the web site indicated by the link. At least some of the links are links to web sites that perform retail functions, such as the selling of digital content. FIG. 3 shows an example where shopping service 300 is adapted to an eBook-reading application, and thus links 304, 306, 308, and 310 are links to sites that distribute eBooks. For example, a user of the application depicted in FIG. 2 might click on the "bookstore" icon 204 in order to shop for eBooks, thereby invoking the shopping service depicted in FIG. 3. It will be appreciated that, when shopping service 300 is associated with an application other than an eBooks-reading application, the links provided in shopping service may be links to web sites that distribute different types of products. For example, if shopping service 300 were associated with an audio- or video-rendering application, then shopping service 300 would preferably display links to web sites that distribute digital audio or video.

In a preferred embodiment, shopping service 300 comprises a form of web browser. For example, the web browser may be a standard web browser with a simplified user interface (that may include fewer user functions than the standard user interface when the browser is opened as a stand-alone). When shopping service 300 comprises a form of web browser, the logic that implements shopping service 300 is capable of displaying and following links to any web site, regardless of whether the web site is a retail web site, and regardless of whether the web site sells products that are related to the application 200 of which shopping service 300 is a part. The particular choice of links displayed (i.e., the fact that at least some of the links are to retail web sites) allows the web browser to function as a shopping service. It will be noted, however, that in the example of FIG. 3, one of the links (i.e., link 302) is not a link to a retail web site, but rather a link to a "bookstore directory," which is described below. The web-browsing logic that shopping service 300 uses to visit web sites is preferably content-agnostic to the type of information contained at the web site; as long as a link is properly listed in shopping service 300, the web browser will follow the link regardless of what type of information is maintained at the site.

Figure 4:
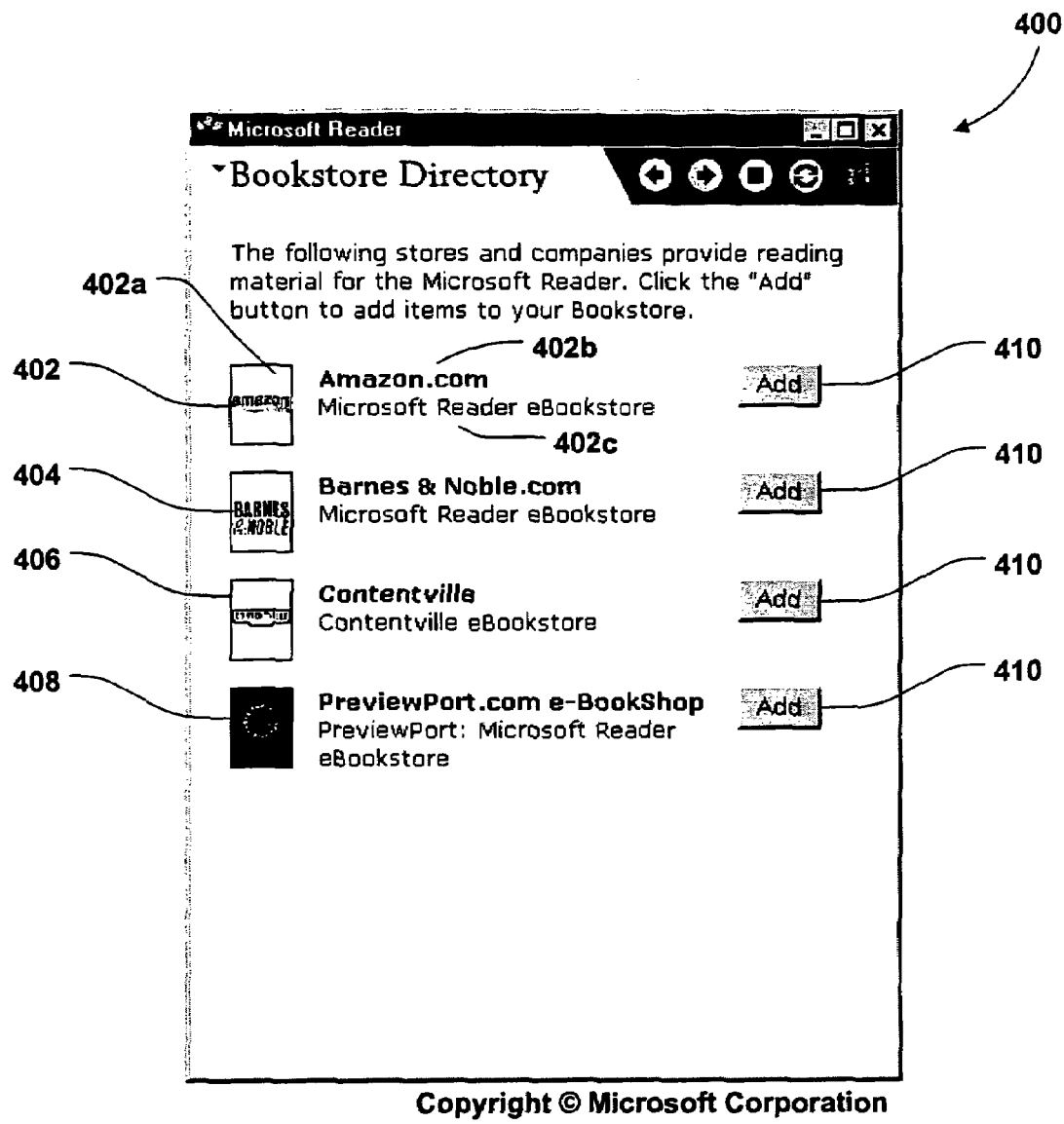
FIG. 4 is a diagram of a retail directory, as displayed on typical web browsing software.

FIG. 4 shows a retail directory 400, as might be displayed on web browsing software. In FIG. 4, retail directory 400 is shown as a "bookstore directory"—i.e., a directory of electronic "bookstores" that sell eBooks—although it will be understood that a directory of eBooks vendors is merely exemplary, and retail directory 400 may comprise a list of any type of web sites without departing from the spirit and scope of the invention. "Web browsing software," in this context, includes general purpose web browsers such as MICROSOFT INTERNET EXPLORER. Preferably, the "web browsing software" is the web browsing functionality associated with shopping service 300, as described above in connection with FIG. 3. As explained below, this web browsing functionality may include special purpose web browsing logic within the application 200 of which integrated shopping service 300 is a part. (As further discussed below, the web browsing functionality that implements a shopping service within an application may, in fact, be provided by a general purpose web browsing program such as INTERNET EXPLORER.) In a preferred embodiment, a user accesses retail directory 400 by clicking a link such as link 302 (shown in FIG. 3) within a shopping service 300.

Retail directory 400 preferably comprises a web page that lists one or more retail web sites. The exemplary retail directory 400 in FIG. 4 lists retail web sites 402, 404, 406, and 408. Each listing includes various components. For example, listing 402 includes a logo 402a, a web site name 402b, and a web site description 402c. Associated with each listing is an "add" button 410. By clicking on the "add" button 410 associated with a particular web site listing, the user adds the web site to his or her personal list of retail web sites. (The process of using the retail directory 400 to add web sites to a personal list is described below in connection with FIG. 8.) Thus, retail directory 400 contains a list of web sites that a user can choose to add to the list displayed by integrated shopping feature 300, and integrated shopping service 300 will display those web sites that the user has selected from retail directory 400. (It should be noted that, in some cases, the integrated shopping feature may be configured to display certain web sites without the user's having selected those sites from retail directory 400.) In an alternative embodiment, retail directory 400 also includes links that can "redirect" a user to another web site. Since retail directory 400 preferably comprises a web page, it will be appreciated that retail directory 400 can include any of the functionality that is normally available in web pages—e.g., the ability to redirect to other sites through clickable links. An operator of retail directory 400 may sell (or otherwise offer) space on the retail directory 400 web page to other sites that wish to benefit from such redirection opportunities, or from the exposure such web sites may gain from being displayed on the web page of retail directory 400.

Structure of an Application Having an Integrated Shopping Service

Figure 5:
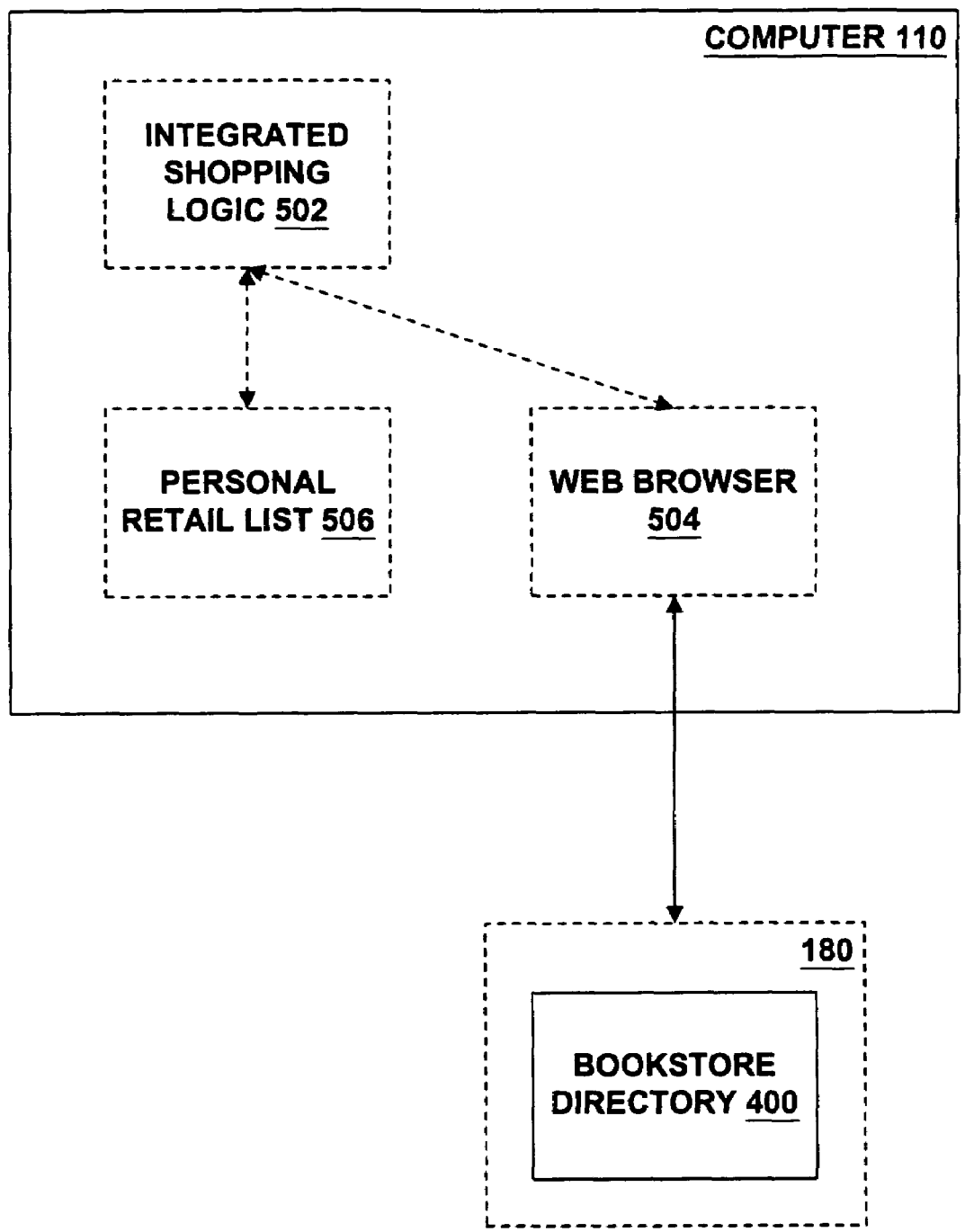
FIG. 5 is a block diagram of a software application having an integrated shopping service according to aspects of the invention.

Referring now to FIG. 5, there is shown an exemplary structure of an application 200 that employs an integrated shopping service 300. Application 200 (which runs on computer 110, shown in FIG. 1), includes integrated shopping logic 502. Integrated shopping logic 502 comprises software which performs functions including: (a) providing the user interface (UI) and functionality that enables a user to visit retail web sites; and (b) maintaining a list of retail web sites that a user may visit as part of integrated shopping service 300.

Integrated shopping logic 502 may employ or provide web browser 504, in order to provide the UI and functionality that permits the visiting of retail web sites. For example, integrated shopping logic 502 may include instructions that start web browser 504 whenever the user invokes integrated shopping service 300. Web browser 504 may be a web browsing module that is specially adapted to work with application 200. Alternatively, web browser 504 may be a general purpose web browser such as the INTERNET EXPLORER browser, which can be invoked from within application 200. When web browser 504 is embodied as a general purpose web browser, application 200 may invoke web browser 504 in such a way that it appears to a user as if it were included within application 200—e.g., integrated shopping logic 502 may invoke web browser 504 inside the window of application 200.

Integrated shopping logic 502 may also employ or provide a personal retail list 506. Personal retail list 506 includes the list of links that are to be displayed by web browser 504. For example, referring back to FIG. 3, in exemplary integrated shopping service 300 links 302-310 may be stored in personal retail list 506. Thus, in a preferred embodiment, application 200 implements an integrated shopping service by invoking web browser 504 and instructing it to display the links found in personal retail list 506.

Integrated shopping logic 502 may include the capability to add (or delete) items from personal retail list 506. In the example of FIG. 5, integrated shopping logic 502 uses web browser 504 to access retail directory 400, and adds new retail sites from retail directory 400 to personal retail list 506. For example, retail directory 400 may be implemented on a remote computer (e.g., remote computer 180, shown in FIG. 1), which functions as a "retail directory server." Retail directory 400 may take the form of an HTML file which is stored on remote computer 180, and which is dynamically updateable to reflect a current list of retail site choices. Thus, the HTML file and the remote computer 180 on which it is stored may be represented together as a universal record locator (URL). A user may access retail directory 400 by clicking on a link (e.g., link 302 shown in FIG. 3), which navigates to the URL of the retail directory 400. When a user accesses retail directory 400, web browser 504 displays the retail directory HTML file as a web page (e.g., the web page shown in FIG. 4). When the user clicks an "add" button 410 for a particular retail web site listed in retail directory 400, logic stored in the web pages executes, thereby causing data representative of the selected retail web site to be downloaded from remote computer 180 to the user's computer 110. Integrated shopping logic 502 then stores the uploaded data in personal retail list 506.

It should be observed that web browser 504 and personal retail list 506 are shown in FIG. 5 as being within application 200. However, this arrangement is merely exemplary, as web browser 504 and personal retail list 506 merely need to be accessible to integrated shopping logic 502, and do not necessarily need to be contained within application 200. For example, web browser 504 may be a dynamic-link library (.dll file) provided as part of the operating system that resides outside of the file(s) that store application 200. Alternatively—and particularly when web browser 504 is a general-purpose web browser—web browser 504 may be a set of files that is separate from the file(s) that store application 200 (e.g., web browser 504 may be the .exe file, and related data files, that store the INTERNET EXPLORER browser). Likewise, personal shopping list 506 could be stored within application 200, but could also be stored as one or more files separate from application 200. In a preferred embodiment, personal retail list 506 is stored under a set of registry keys in the WINDOWS registry of the device on which application 200 is installed. (Certain parts of the retail list may be stored outside of the registry; for example, a bitmap for a logo, being several kilobytes in size, may be stored in a separate file.)

Exemplary Structure of a Retail Directory

Figure 6:
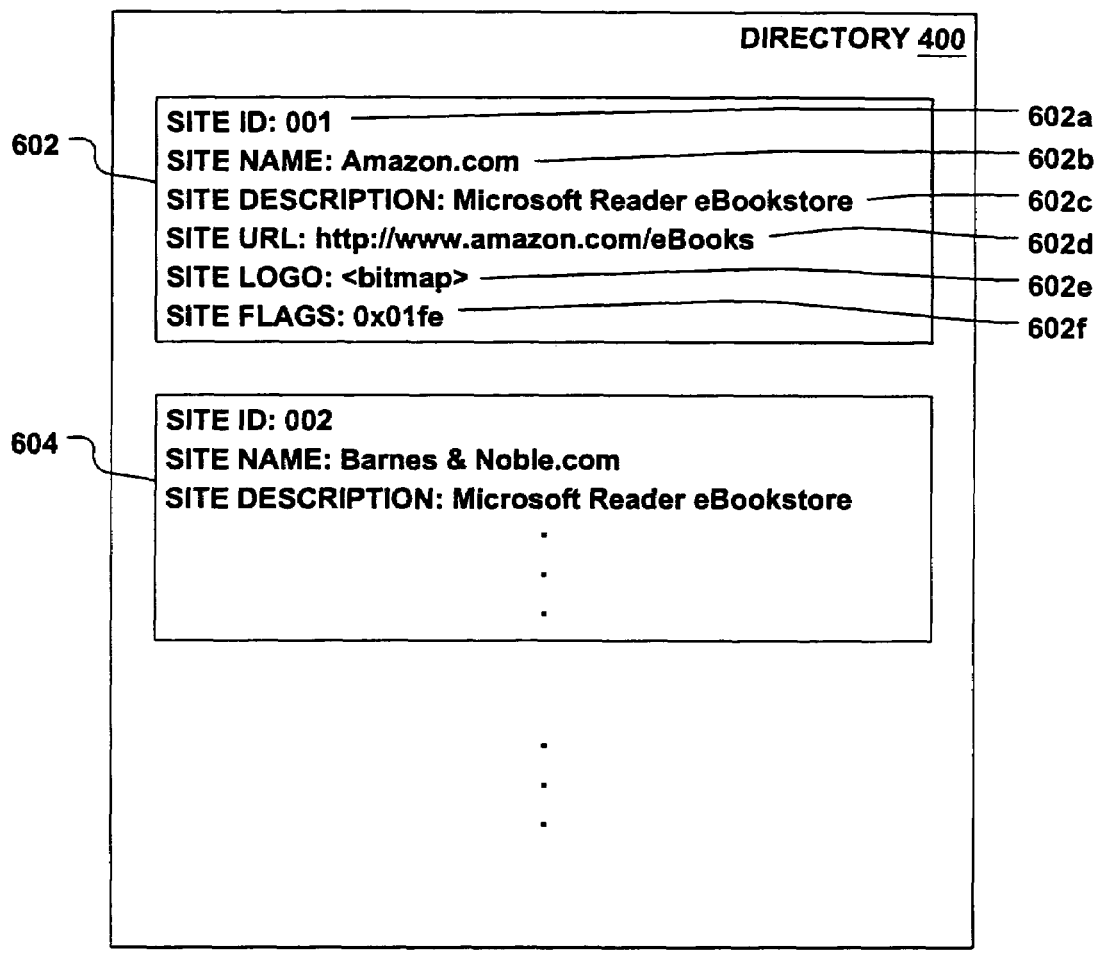
FIG. 6 is a block diagram of an exemplary data structure for a retail directory.

FIG. 6 shows an exemplary structure of retail directory 400. As noted above, retail directory 400 comprises a list of retail sites that may be added to a user's personal retail list. As also noted above, each retail site is represented by certain data. FIG. 6 thus shows an exemplary data structure for retail directory 400, including the various data fields that are used to represent each retail site.

Retail directory 400 lists various retail sites. Each retail site has an entry 602, 604. FIG. 6 shows only two entries, but it will be understood that the number of entries shown is merely exemplary, as retail directory 400 may have any number of entries; the actual number depends on the number of retail sites that are available to be used with an integrated shopping service 300. In the example of FIG. 6, entry 602 and 604 correspond to retail web sites 402 and 404, respectively (shown in FIG. 4).

Each entry in retail directory 400 is represented by various data fields. In the example of FIG. 6, entry 602 includes a site ID 602a, a site name 602b, a site description 602c, a site URL 602d, a site logo 602e, and site flags 602f. Other entries include like data fields. The site ID 602a is a number that is assigned uniquely to each site that appears in the retail directory. The number may, in one example, be used by integrated shopping service 300 to sort the entries when they are displayed to the user. In this case, the particular site ID 602a assigned may be based on a business relationship with the owner/operator of the web site—that is, the distributor of application 200, and the owner/operator of the web site, may agree that web site will appear in a specified order on the list displayed by integrated shopping service 300, in which case the site ID 602a may be used to fulfill that agreement when the sites are sorted by their respective side IDs. The site name 602b is the commonly used name for a particular web site. For example, the web site whose URL is http://www.amazon.com is commonly known as "amazon.com," and thus the site name field 602b contains "amazon.com." The site description 602c is a text string that preferably describes the site. In the example, the site description of "amazon.com" is "Microsoft Reader eBookstore." The site URL 602d is the actual URL at which the site is located, and it may not be shown as part of the user interface. Site logo 602e is a graphical image (e.g., a bitmap) that is associated with the retail site represented by entry 602. Typically, the graphical image is the logo associated with a retail site, although any image may be stored in field 602e. Site flags 602f include technical information about the retail site, for example, the file format of site logo 602e. It should be understood that data fields 602a-602f are merely exemplary, and a web site could be represented by any appropriate data without departing from the spirit and scope of the invention.

The web page that a user's computer 110 downloads when viewing retail directory 400 includes: (a) the information in each entry 602, 604 (or at least a subset of that information), in a format suitable for rendering by a web browser; and (b) executable instructions that cause the information in each entry to be downloaded to the user's computer 110 when the user clicks an "add" button 410 (shown in FIG. 4). It should be noted that the data that is added to a user's personal retail list 506 when an "add" button 410 is clicked may in fact be an exact copy of the data in the selected entry 602, 604.

It should be noted that retail directory 400 may be stored by any means and in any manner that supports the storage of data. As one non-limiting example, all entries 602, 604 may be stored in a file. As a further example, the file that stores entries 602 and 604 may, in fact, be an HTML file that is downloaded to a user's machine for viewing as the retail directory web page. In this case, the retail directory page shown in FIG. 4 is merely the rendering of the HTML page. When retail directory 400 is represented as such an HTML page, some data may be stored in non-printing fields. (E.g., the site ID 602a, site URL 602d, and site flags 602f may be stored in non-printing fields or as part of the scripting code executed by the web page, since those items are not displayed when the retail directory page is rendered on a browser as shown in FIG. 4.)

Exemplary Structure of a Personal Retail List

Figure 7:
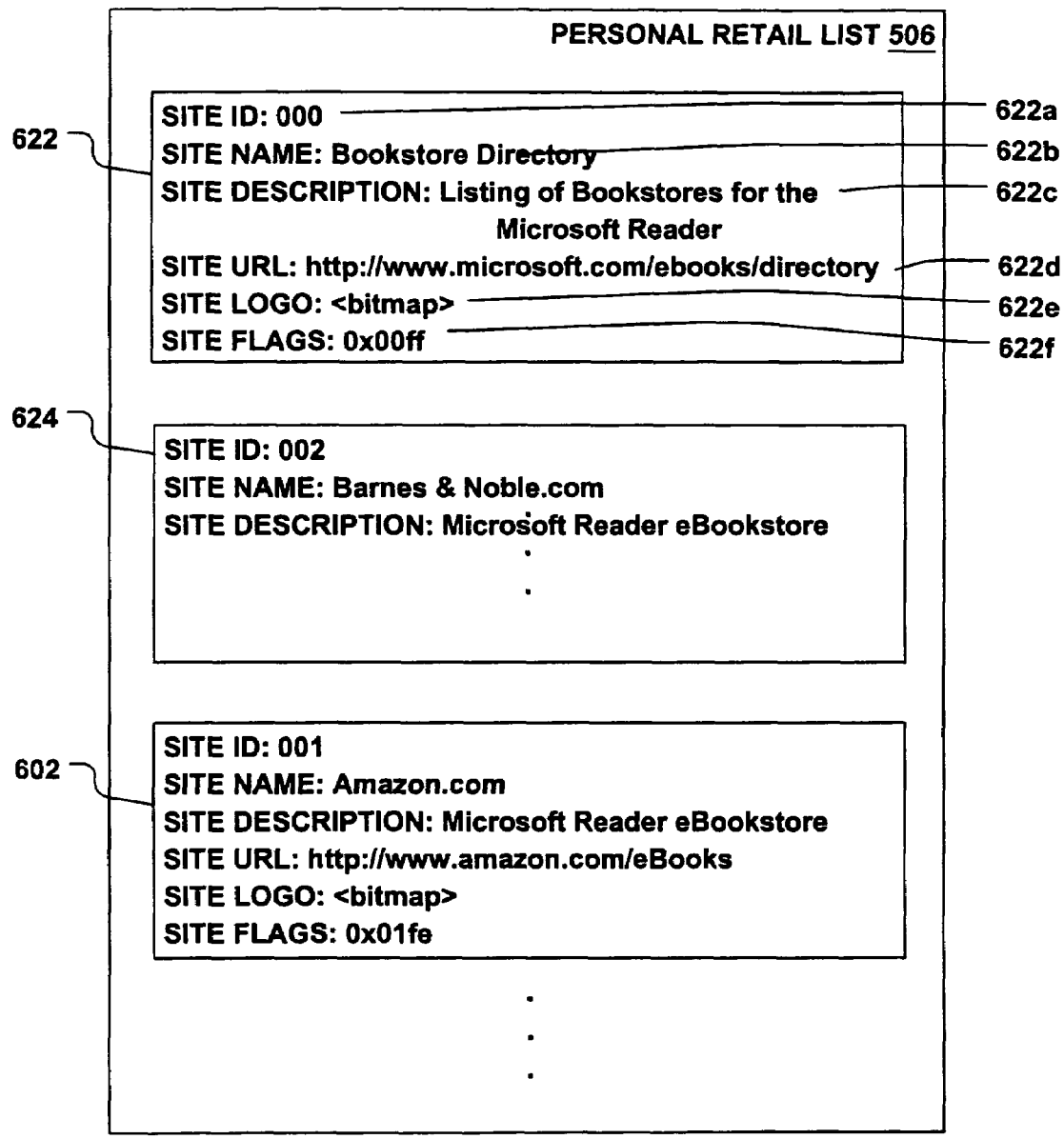
FIG. 7 is a block diagram of an exemplary data structure for a personal retail list.

FIG. 7 shows an exemplary structure of a personal retail list 506, which is stored on the computing device that runs the application 200 with which integrated shopping service 300 is associated. Personal retail list 506 includes a plurality of entries 602, 622, 624, which correspond to the various web sites that a user can access from within integrated shopping service 300. In order for a web site to be accessible from within integrated shopping service 300, an entry corresponding to that web site is included in personal retail list 506.

Entry 622 includes data fields for a site ID 622a, site name 622b, site description 622c, site URL 622d, site logo 622e, and site flags 622f. Entries 624 and 602 include like fields. As can be seen from a comparison between FIGS. 6 and 7, the format of the entries in persona retail list 506 correspond to the format of the entries in retail directory 400. It will be noted that, in the example of FIGS. 6 and 7, entry 602 appears in both personal retail list 506 and in retail directory 400. Preferably, entries in retail directory 400 and personal retail list 506 are in the same format. More preferably, entries are inserted into personal retail list 506 by copying them from retail directory 400, which occurs when a user selects a web site in retail directory 400 to be included in his or her personal retail list 506 by clicking "add" button 410. The process of migrating information from retail directory 400 to personal retail list 506 is described below in connection with FIG. 8.

It will further be observed that the first listed entry 622 in FIG. 7 is an entry for the retail directory 400 itself. This example underscores two points: First, any web site may be listed in personal retail list 506, regardless of whether it is a retail web site or some other type of web site; integrated shopping service 300 is most useful when personal retail list 506 includes at least some retail web sites, but the architecture of integrated shopping service 300 permits any type of web site to be represented in personal retail list 506 (and rendered by web browser 504). Second, as discussed above, retail directory 400 is implemented as an ordinary web site, and thus can be visited like any other web site. Moreover, by implementing retail directory 400 as an ordinary web site, retail directory 400 can be designed with the breadth of functionality available to web sites in general (i.e., retail directory 400 may have all the features supported by HTML, and most importantly, it can be updated at any time, even after the application has been installed by the user). This aspect of the invention supports the extensibility of application-integrated retail directories, which is a significant advance.

It will be appreciated that the data structure shown in FIG. 7 is merely exemplary, and personal retail list 506 may store any type of information (in any format), so long as the information identifies those web sites that may be visited from within integrated shopping service 300. Moreover, personal retail list 506 may be stored in any manner (e.g., in a file, under a set of registry keys, inside a database, etc.) without departing from the spirit and scope of the invention. Preferably, personal retail list is at least partly stored under a set of registry keys that can only be modified by the server that provides retail directory 400; this type of storage gives the entity that provides retail directory 400 control over the content of personal retail list 506 by deterring user modification.

Process of Using Retail Directory 400 to Select Retail Web Sites

Figure 8:
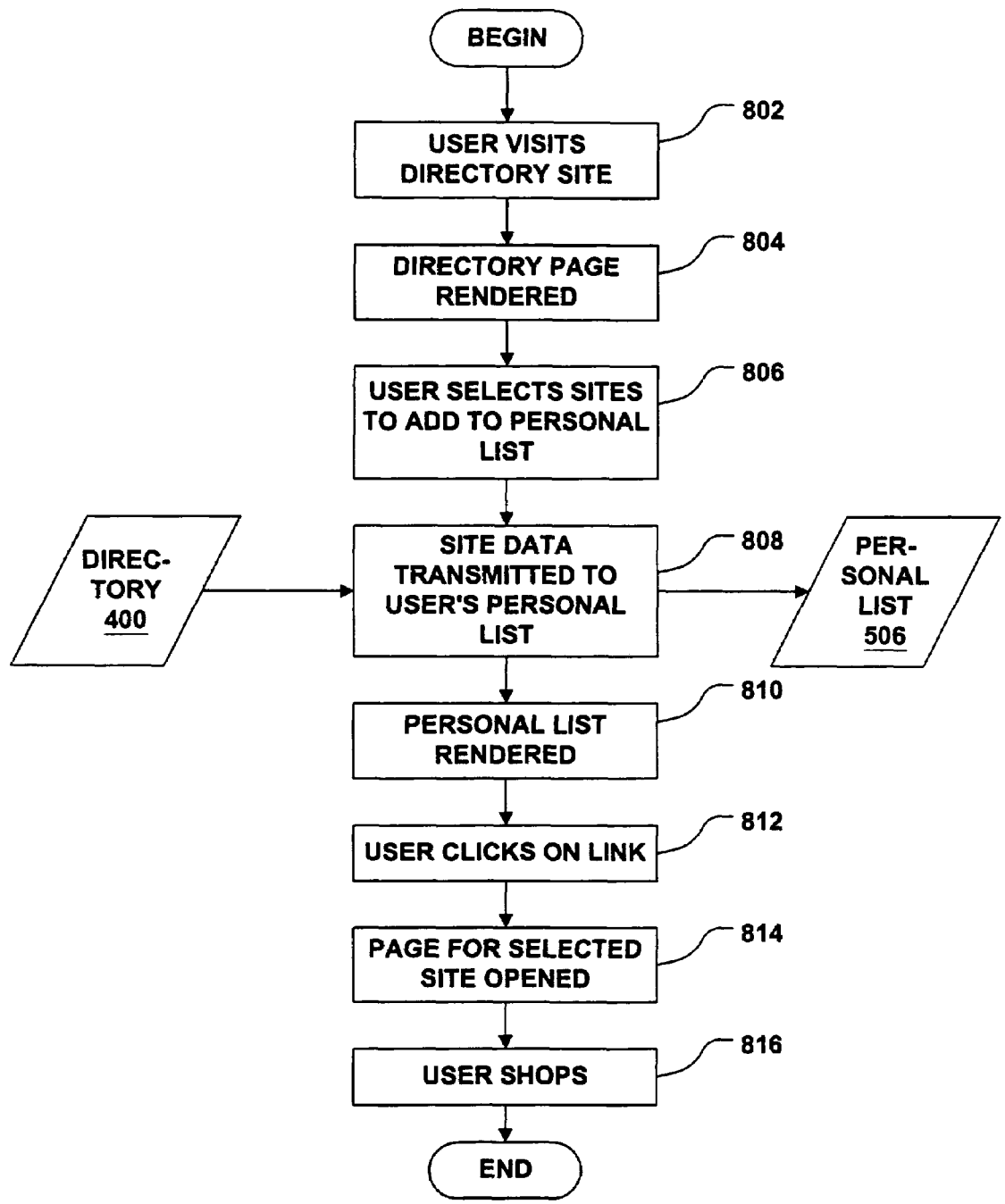
FIG. 8 is a flow diagram of an exemplary process for using a retail directory to add retail web sites to a personal list, in accordance with aspects of the invention.

FIG. 8 shows an exemplary process by which a user accesses retail directory 400 and adds web sites to his or her personal retail list 506. At step 802, the user visits retail directory 400. This action may be performed by a user's opening an ordinary stand-alone browser (e.g., the MICROSOFT INTERNET EXPLORER browser), and visiting the retail directory web site by entering a URL. Preferably, the URL of the retail directory 400 web site is included in personal shopping list 506 (or is otherwise incorporated into application 200 that includes integrated shopping service 300), so that the user may visit the retail directory web site using integrated shopping service 300. In one example, application 200 is delivered to the user with a personal shopping list 506 that includes an entry for retail directory 400, so that the user will initially be able to access retail directory 400 from integrated shopping service 300.

At step 804, the retail directory page is rendered on the user's device. The rendering is performed either by a stand-alone browser (if the user uses a stand-alone browser to visit the web page), or by web browser 504 (shown in FIG. 5), if integrated shopping service 300 has been used to visit retail directory 400.

At step 806, the user selects web sites to add to personal retail list 506. As noted above in connection with FIG. 4, the user may make this selection by "clicking" on an "add" button 410. In response to the user's selection, an entry for the selected web site is inserted into the user's personal retail list 506 (step 808). As shown in FIG. 8, the step of inserting this entry may be performed by copying an entry from retail directory 400 to personal list 506 (e.g., by copying the data over the Internet).

After a user has selected a web site from retail directory 400 and the appropriate entry has been inserted into personal retail list 506, the user may invoke the integrated shopping feature 300 in order to visit those sites in personal retail list 506 (including the sites that the user just added at steps 802-808). When integrated shopping service 300 is invoked, links to the web sites in the user's personal retail list 506 are rendered (step 810). (FIG. 3 shows an example of the integrated shopping service 300 rendering links to sites that are listed in personal retail list 506). In order to visit one of the sites, the user clicks on the links (step 812), at which point the page for the selected site is opened (step 814). The user is then able to browse the selected site and shop for content (step 816).

EXAMPLE

Use of Integrated Shopping Service to Purchase eBooks

Figure 9:
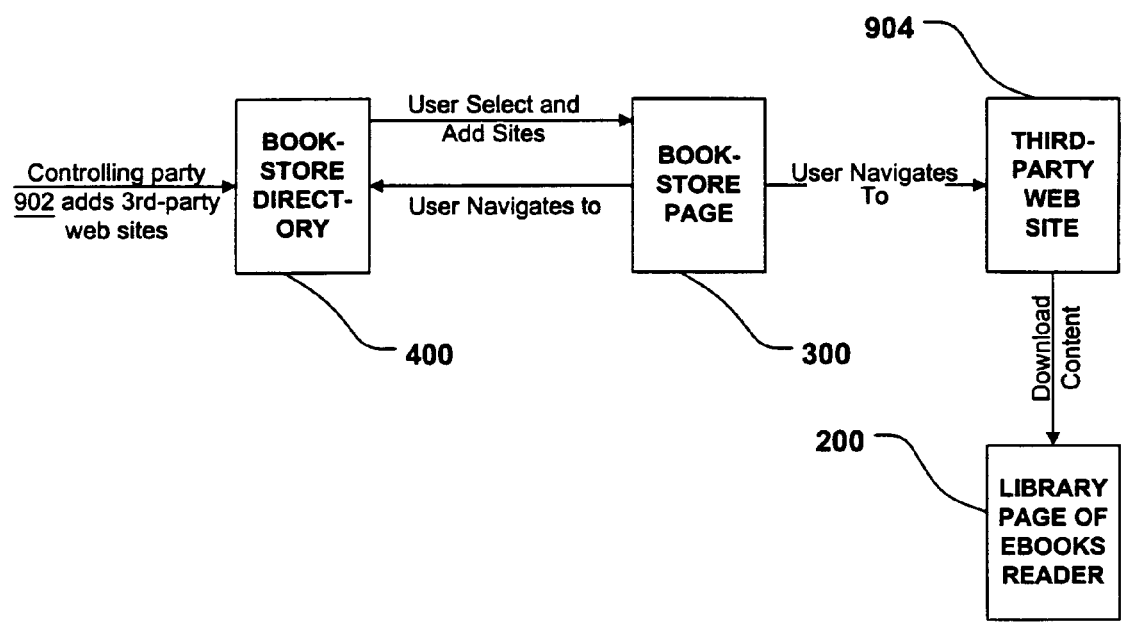
FIG. 9 is a block diagram of aspects of an exemplary system architecture according to the invention, indicating an exemplary flow of information through the architecture.

FIG. 9 shows an example in which the present invention is used to purchase electronic books (eBooks) from within an eBooks rendering software application.

As shown in FIG. 9, a controlling party 902 adds third-party web sites to retail directory 400. In this example, retail directory 400 is a "bookstore directory," which lists retail web sites that distribute eBooks. Controlling party 902 is the party that controls the constituency of bookstore directory 400. For example, controlling party 902 may be the manufacturer and/or distributor of the application 200 which uses integrated shopping service 300. As another example, controlling party 902 may be a different party that has been engaged to control which web sites may be listed in bookstore directory 400.

A user may navigate to bookstore directory 400—e.g., by using a stand-alone browser, or by using integrated shopping service 300 (which, as noted above, may include a browser). The user views the bookstore directory 400 and chooses web sites from bookstore directory 400 to add to his or her personal retail list 506 (shown in FIG. 5). In response to the user's selection, bookstore directory 400 transmits to the user's machine data (e.g., the "entries" shown in FIGS. 6 and 7) that correspond to the user's chosen web sites. These choices are stored in personal retail list 506 and are displayed on the user interface of integrated shopping service 300, which, in this example, is a "bookstore page."

From bookstore page 300, the user navigates to a "third-party web site." The third-party web site is one of the sites displayed on the bookstore page. For example, and referring for the moment back to FIG. 3, link 304 ("Barnes & Noble.com") is an example of a third-party web site. As previously noted, integrated shopping service 300 (which is bookstore page 300, in this example) includes or employs a browser (or equivalent browsing functionality), which allows a user to navigate to the third-party web sites from within the application of which integrated shopping service/bookstore page 300 is a part. The user then uses the third-party web sites to shop for content. In this example, the third-party web sites are electronic bookstores that provide eBooks. Thus, the user can purchase eBooks from the third-party web sites from within the eBook-reading application, and download such eBooks to his or her computing device.

Once the eBooks are downloaded to the user's computing device, a list of downloaded eBooks is displayed by the rendering application. For example, the purchased eBooks may be displayed on a "library page," such as that shown in FIG. 2. The user may then use the eBook-reading application to open and render the eBooks.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A system for supporting electronic commerce, the system comprising:
   a first computing device which includes:
      a first memory which stores first data indicative of a plurality of web sites;
      a network interface communicatively coupled to a computer network;
      first logic which communicates, through said network interface, a list of said plurality of web sites to be rendered by a second computing device in a content-rendering application, wherein the list is generated according to a context of the content-rendering application; and
      second logic which identifies at least one of the plurality of web sites selected from the second computing device,
   wherein the second logic communicates second data indicative of the selected one of said plurality of web sites to said second computing device through said network interface, and
   wherein the second logic provides instructions to invoke the selected web site from within the content-rendering application, wherein the second data may be stored in a second memory associated with the second computing device for modifying by the user from the second computing device.

2. The system of claim 1, wherein said second logic communicates said second data based on a user selection of said one of said plurality of retail web sites, said user selection being received from said second computing device.

3. The system of claim 1, wherein said first data includes, for each of said plurality of retail web sites:
   a universal record locator;
   one or more items of text; and
   a graphical image.

4. The system of claim 3, wherein said first data further includes:
   an identification number; and
   a flag.

5. The system of claim 1, wherein said first data comprises an HTML web page, said web page including:
   said second data;
   instructions which cause said second data to be transmitted to said second computing device; and
   a user-selectable image which invokes said instructions.

6. The system of claim 5, wherein said user-selectable item comprises an ADD button.

7. The system of claim 1, wherein said second logic causes said second data to be written to a registry on said second computing device.

* * * * *